(12) United States Patent
Langlotz et al.

(10) Patent No.: US 11,539,886 B2
(45) Date of Patent: Dec. 27, 2022

(54) CAMERA WITH SHUTTER RELEASE CONTROL OF FRAME RATE

(71) Applicant: Bulletproof Property Management, LLC, Cheyenne, WY (US)

(72) Inventors: Bennet Langlotz, Dallas, TX (US); Ken Rockwell, New York, NY (US)

(73) Assignee: Bulletproof Property Management, LLC, Cheyenne, WY (US)

( * ) Notice: Subject to any disclaimer, the term of this patent is extended or adjusted under 35 U.S.C. 154(b) by 0 days.

(21) Appl. No.: 17/190,160

(22) Filed: Mar. 2, 2021

(65) Prior Publication Data

US 2022/0286608 A1 Sep. 8, 2022

(51) Int. Cl.
*H04N 5/232* (2006.01)
*G06F 3/041* (2006.01)
*G06F 3/01* (2006.01)
*H04N 1/00* (2006.01)
*G03B 17/38* (2021.01)

(52) U.S. Cl.
CPC ......... *H04N 5/23245* (2013.01); *G03B 17/38* (2013.01); *G06F 3/016* (2013.01); *G06F 3/0414* (2013.01); *H04N 1/00387* (2013.01); *H04N 5/23216* (2013.01)

(58) Field of Classification Search
CPC .......... H04N 1/00387; H04N 5/23216; H04N 5/23245; G06F 17/38; G06F 17/40
See application file for complete search history.

(56) References Cited

U.S. PATENT DOCUMENTS

2003/0146981 A1\* 8/2003 Bean .................... H04N 5/2353
348/E5.037

\* cited by examiner

*Primary Examiner* — Daniel M Pasiewicz
(74) *Attorney, Agent, or Firm* — Bennet K. Langlotz; Langlotz Patent & Trademark Works, LLC

(57) ABSTRACT

A camera has a shutter trigger connected to the body, a controller operably connected to the trigger, and a shutter operably connected to the trigger. The shutter is operable at a plurality of frame rates and the controller is responsive to the shutter trigger in the first condition to operate the shutter at a first frame rate. The controller responsive to the shutter trigger in the second condition to operate the shutter at a different second frame rate.

12 Claims, 5 Drawing Sheets

CAMERA WITH SHUTTER RELEASE CONTROL OF FRAME RATE

FIELD OF THE INVENTION

The invention relates to camera, and to cameras having a range of frame rates.

BACKGROUND AND SUMMARY

Cameras often have a range of different shutter frame rates. A modern camera may have a single shot mode in which a sustained press of the shutter release button generates only a single image. Other modes may provide bursts, or sustained continuous exposures taken at a selected frame rate. The frame rate may be a low rate such as three per second, and this and other rates may be user selectable. A high-speed mode may employ the camera's maximum frame rate. When the camera's frame rate is very high, such as 10-20 frames per second (FPS), one or more intermediate frame rates may be provided as options. The different frame rates may also be associated with different shutter types, such as mechanical focal plane shutters, and electronic shutters, as well as global shutters that use the image sensor to capture a succession of images without the use of an interrupting shutter between the lens and the image sensor.

Selection of the shutter mode is typically done in the camera's menu settings, or by assignment of a programmable button or other control to set the shutter mode, which is sometimes referred to as "advance" mode from earlier film cameras that advanced the film with each exposure.

Cameras also employ shutter releases with multiple functions. For instance, the shutter release button may be a switch that responds to a lighter and shorter excursion press by actuating or enabling camera functions like on-off, metering, focusing and the like, but not actuating the shutter. This is the first threshold of actuation. Shutter actuation is generated by a more forceful or greater excursion to a second threshold, which is usually before the switch bottoms out at the limit of travel. For shutter actuation purposes, the typical switch has only two states: actuated and un-actuated.

Cameras have been proposed with non-mechanical or hybrid switches that employ a surface having touch sensitivity in the manner of smart phone screens and camera rear image screens. Japanese Patent Application Laid-Open No. 2020-201756 published Dec. 17, 2020 and titled "Electronic device and its control method" is incorporated herein by reference. It discloses such a system and employs a touch pad at the normal location of the shutter release button to provide other functions by the movement and position of the user's shutter trigger finger. This is disclosed as having both capacitive touch location detection, and a strain gauge for force (pressure) detection. While effective to provide many functions and benefits, this does not address the need for rapid and convenient selection of shutter frame rate.

The preferred embodiment achieves these benefits by providing a camera that has a shutter trigger connected to the body, a controller operably connected to the trigger, and a shutter operably connected to the trigger. The shutter is operable at a plurality of frame rates and the controller is responsive to the shutter trigger in the first condition to operate the shutter at a first frame rate. The controller responsive to the shutter trigger in the second condition to operate the shutter at a different second frame rate.

DETAILED DESCRIPTION OF A PREFERRED EMBODIMENT

Figure 1:
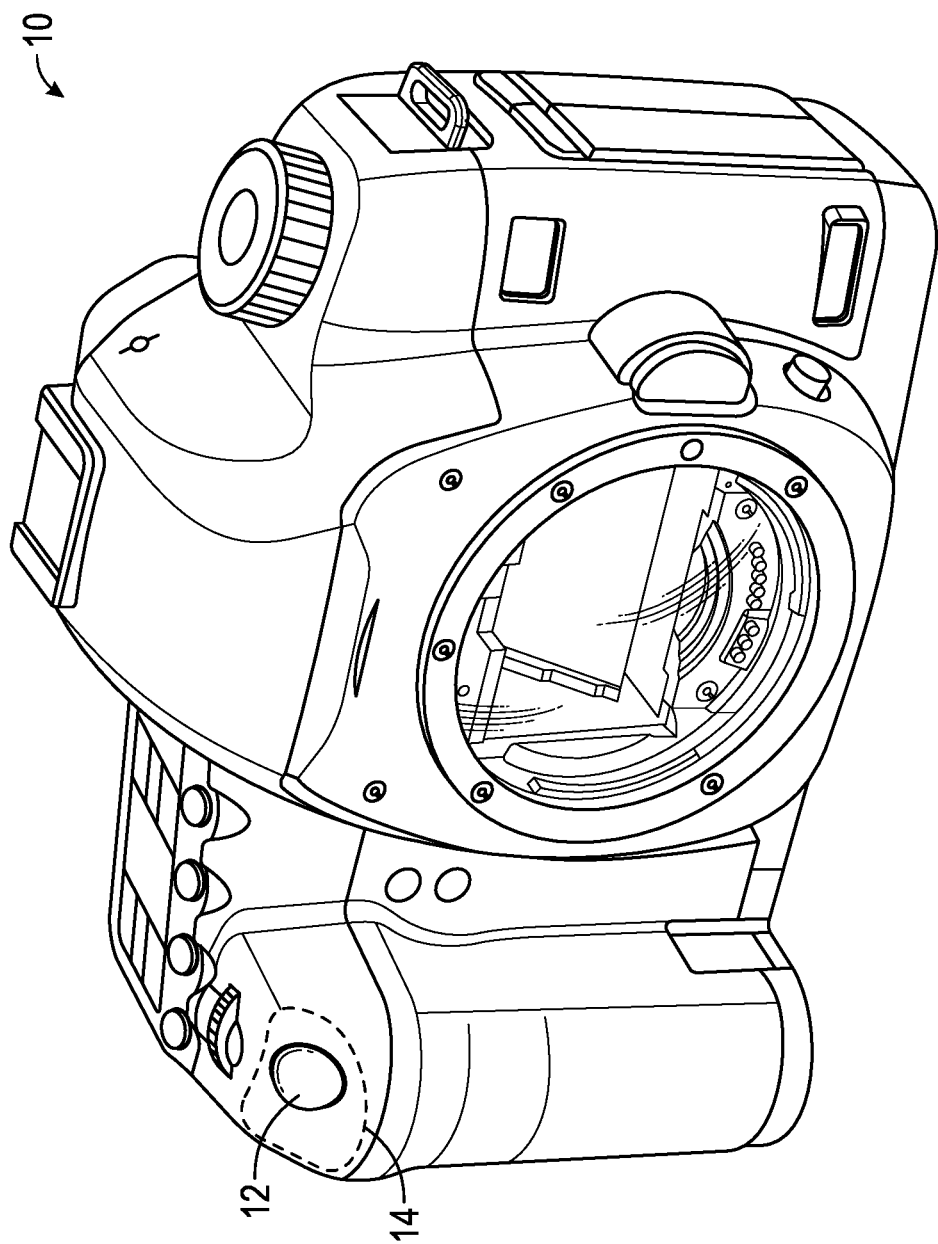
FIG. 1 shows a digital camera with a shutter trigger button.

FIG. 1 shows a digital camera 10 with a shutter trigger button 12. In alternative embodiments, the button may be absent and replaced with a touch sensitive zone with border 14. In a typical embodiment, the button 12 moves in response to an applied force from an initial rest position through a range of motion to a limit position generally in a downward direction.

Figure 2:
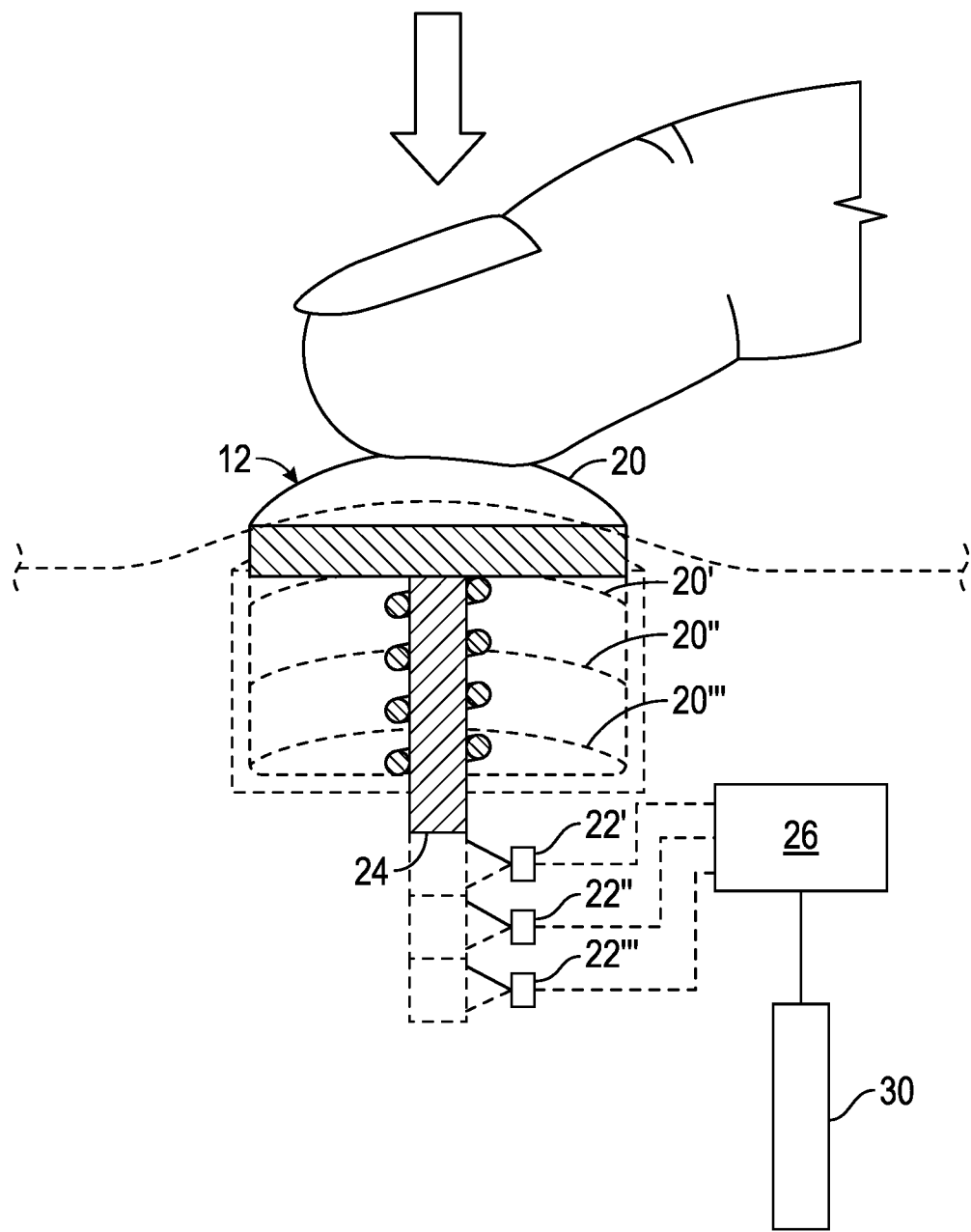
FIG. 2 shows a highly simplified schematic view of a spring-loaded shutter trigger button.

FIG. 2 shows a highly simplified schematic view of a spring-loaded shutter trigger button. It moves from a rest position 20 progressively through a range of positions 20', 20", to a limit position 20'''. A set of internal switches 22', 22", 22''' are each associated with a corresponding position 20', 20", 20''' to shift to a different (on vs. off) state in response to the button element lower end 24 actuating each switch (schematically). The switches are connected to a controller or processor 26 that is connected to a shutter 30.

In practice, much more compact and low-profile switches are employed, including membrane switches. Other switches may include motion encoders that transmit the position of the button element in its range of motion via optical, magnetic, electronic or other motion and position encoding systems. Any switch that indicates the switch position to distinguish between at least two positions in addition to the rest position may be employed. The preferred embodiment illustrates three active positions, and this preferably includes an undepicted additional position for a lightest actuation to trigger not the shutter but camera functions including wake-up, preview, focus and exposure actuation.

As an alternative, the moving button may include an encoder that records not several discrete positions as depicted, but a continuously variable measure of position, or a multitude of positions that effectively serves as continuous. The switches are shown schematically, and may be a rheostat, variable resistor, magnet and Hall effect sensor.

Figure 3:
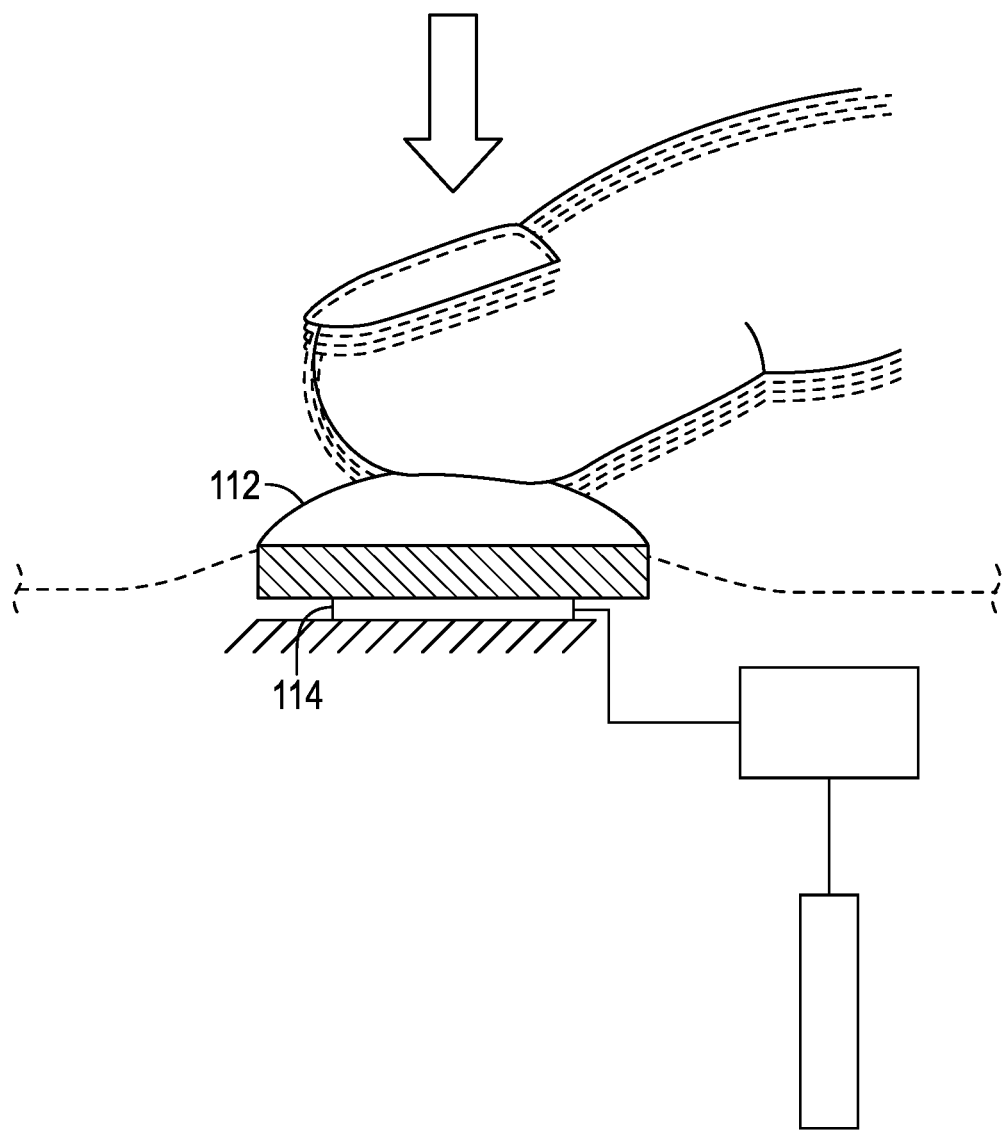
FIG. 3 illustrates a shutter button connected to a strain gauge.

Shutter buttons with motion perceived by the user are widely preferred, but FIG. 3 illustrates a shutter button 112 connected to a strain gauge that does not perceptibly move in response to normal forces, and which records the degree of force by the user's finger, shown in different states of compression to illustrate the different applied force. The strain gauge may be any force detector, including those that move in response to touch, but which detect different degrees of force to distinguish from different intended frame rates.

Preferably, the switch provides tactile feedback to tell the user how "far" he has pressed or how many clicks he has pressed. These may have different degrees of intensity to further indicate a more extreme level by a sharper tactile feedback.

Figure 4:
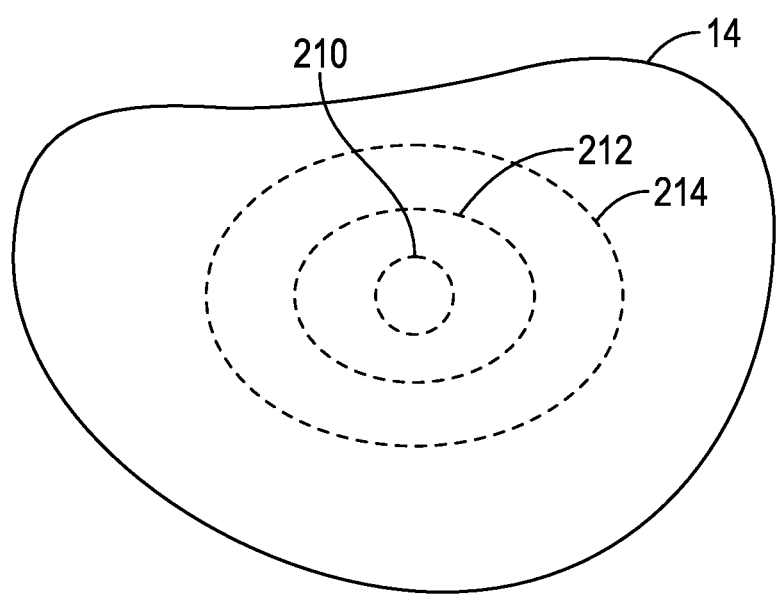
FIG. 4 illustrates an alternative with a touch panel for shutter actuation.

FIG. 4 illustrates an alternative with a touch panel 14 for shutter actuation as disclosed above. This records the degree of pressure or force (the terminology used interchangeably herein) by recording the area 210, 212, 214 that the touch-sensitive surface detects is contacted by the user's fingertip. With a larger area indicating greater pressure. This touch pad may also be combined with the displacement or force detectors of the prior embodiments, with the ability to detect both area of contact (such as for more sensitive touch pad for preview and other non-shooting functions, and/or for single shots or other frame rates less than max) and greater forces or max displacements.

These touch pad functions may also be applied to shutter controls actuated by touching a rear display screen. An additional embodiment for the rear (or front) touch screen would be to use a light touch to indicate a subject for focus or exposure, and a firmer touch for shutter actuation. For example: Touch to select, push to trigger (possibly push harder to shoot at a greater frame rate).

Figure 5:
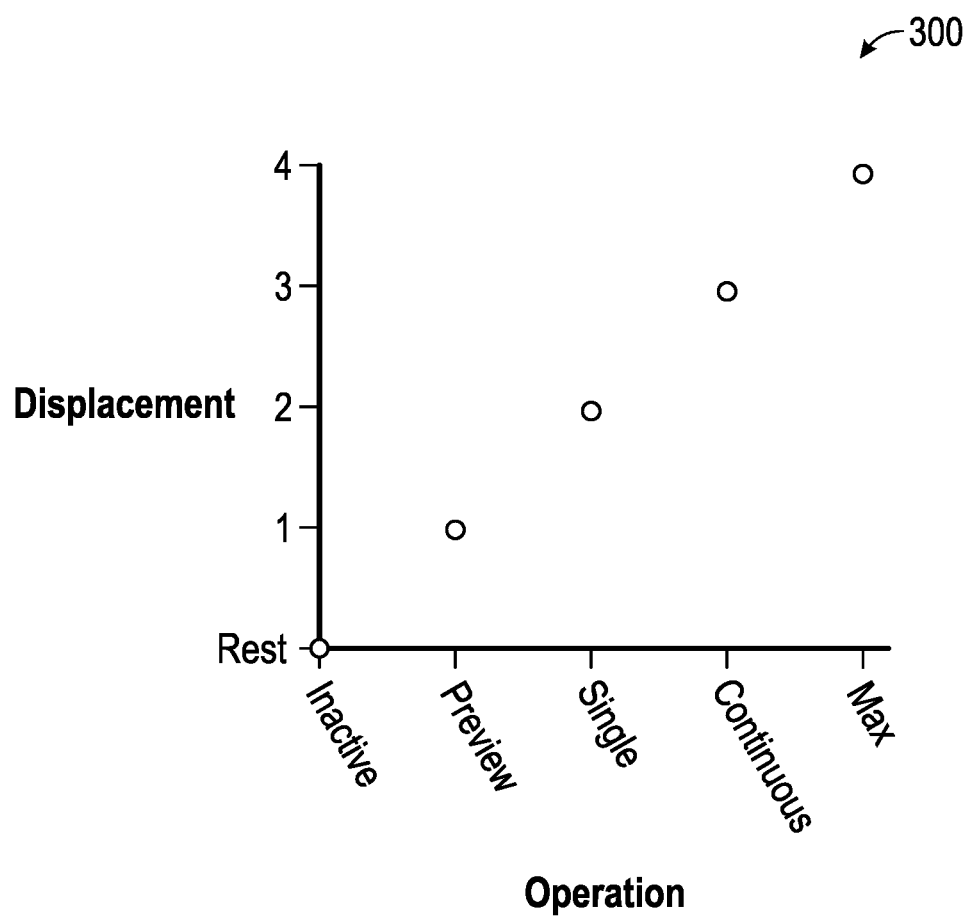
FIG. 5 shows that the controller may respond to the multi-position (or continuous) trigger by operating the shutter differently at different settings.

The controller may respond to the multi-position (or continuous) trigger by operating the shutter differently at different settings. One example is illustrated in FIG. 5. In chart 300. The vertical axis indicates button displacement, and the horizontal axis indicates shutter operation. In the first "rest" position, the button is not depressed, and no action is taken so the operation status is "inactive".

The lightest depression to position 1 establishes the "preview" condition, with no shutter operation.

Position 2 provides the first preferred shutter operation, such as single shot even as the button is held in this position. Users may elect to program this to a slow (e.g 3 frames per second—FPS) continuous mode that is easy to ensure single shots with the shutter finger withdrawing normally without haste.

Position 3 provides intermediate shutter frame rates that may be a slow rate (3 FPS), or a practical moderate rate (e.g. 5-10 FPS) that provide moderate ability to capture active scenes without generating excessive unwanted images that consume and resources including photographer review time.

Position 4 is the greatest displacement (and force) and invokes a max frame rate that might be a 20 FPS rate using electronic shutter such as a Canon EOS R5.

There may be an unlimited number of positions for different frame rates, limited only by firmware resources and the desire to avoid complexity. Different profiles may be set by the manufacturer, and customizable profiles may be provided.

At a minimum, at least two different shutter-active positions are provided (in addition to a rest and optional preview position). The higher force position is normally a faster frame rate, and may be set to the maximum from whatever is the normal setting selected by the user.

The higher or highest force selection may be thought of as a "panic" mode to invoke any action desired in psychologically intense situations where the natural ergonomic response is to squeeze the button harder. This may include the desire to capture shots and override a camera's programming not to capture images when not satisfactorily in focus. Other options include "pick the other one!" responses to focus on a different subject than the camera has selected. Or, "focus distant!" for a photographer trying to capture a fleeting distant aircraft or bird in a flat bright sky when the focus is hunting closer than is desired. This might well be the trigger that tells the smart firmware that all its assumptions about the user's desires are not correct, and to try applying a second-choice scenario. Other uses for the mode may be to override other limitations including thermal limits that may otherwise prevent imaging a critical event, and provide a margin of usability before other measures are taken.

The high-force "max" or "panic" mode may also be used to take action only after a duration of application of the force. One action might be taken immediately upon application of the max force, and them if that is sustained for more than a certain time, another "emergency" action can be taken. Simple high frame rate might occur immediately, but in emergency circumstances when an override is needed after a duration of pressure (perhaps without any shutter action) a limit preventing operation is overridden.

The maximum setting need not be in the shutter button or switch that controls other actions. For instance, a touch screen may be atop a strain gauge so that some functions are controlled by the touch screen, but the max shutter rate, panic, or override function are invoked by a significant force detected by the strain gauge. The strain gauge need not even be located under or proximate to the shutter trigger button. Another structural element of the camera body may be selected for its response to high forces at the shutter trigger button, and a strain gauge applied at that location.

CHANGING FRAME RATE FOR CONVENTIONAL SHUTTER TRIGGER SYSTEMS

A convention shutter trigger having only one active position (in addition to the rest position and preview position) may provide additional benefits when the controller is programmed to operate in an rate-changing mode. The rate changing mode may be programmed to changes from one mode to another, possibly through more than two modes based on the duration of pressure, as opposed to the degree as noted above. The system immediately images a first shot upon activation, then pauses for a selected interval until the next shot is taken, and subsequently continues imaging at a different frame rate, normally with shorter intervals between the second and third frames (and optionally subsequent) as between the first and second frame.

For example, the interval between the first and second frame may be set to allow a deliberate and careful application and withdrawal of pressure to trigger the shutter without jerking motion that might generate unwanted image blur. Some users may prefer an interval of ⅓ second, and others ½ second, but this is normally set to enable the user to generate single shots with a comfortable motion without generate unintended double shots more than rarely.

Subsequent shooting if the trigger is depressed is at a different (typically faster) frame rate that the first interval that is designed to avoid double shots. This may 4-5 FPS for users desiring some rapidity of exposures without extreme speed. Others might wish to have max frame rates (10-20 FPS) after the interval, with the interval selected to protect against the flood of unwanted additional exposures. Another example may be a first interval of ⅓ to ⅕ second for the first shot for an action shooter who doesn't mind having occasional or frequent double shots, followed by a high-speed frame rate to follow.

In one embodiment, there may be more than two different frame rate periods. The initial interval between first and second shot may be set at one duration to enable single shots, and a second period of one or more shots at a faster multiple shot rate, with a third period at a faster or maximum frame rate. The number of additional periods with different frame rates is limited only by the desire to avoid needless complexity.

For all these discussions the stated interval or rate is based on the time between successive shutter openings, not the actual closed shutter period. Of course, these are optional settings, and a high-speed user indifferent to extra frames would not normally invoke this option, which is probably more attractive to a normal shooter who wants to have very high speeds on tap for special circumstances (e.g blowing out birthday candles, portrait photographer capturing unusual action) without needing to make special settings or to shoot excessive frames

EXAMPLE 1 (TYPICAL)

Interval from shot 1 to shot 2: 0.5 second (2 FPS)
Interval between each of shots 2-5: 0.2 second (5 FPS)
Interval after shot 5: 0.1 second (10 FPS)

EXAMPLE 2 (FASTER USER REFLEXES FOR SINGLE SHOT OR MORE TOLERANT OF DOUBLES)

Interval from shot 1 to shot 2: 0.33 second (3 FPS)
Interval between each of shots 2-4: 0.2 second (5 FPS)
Interval after shot 4: 0.05 second (20 FPS)

EXAMPLE 3 (HIGH SPEED ACTION SHOOTER)

Interval from shot 1 to shot 2: 0.2 second (5 FPS)
Interval between each of shots 2-10: 0.1 second (10 FPS)
Interval after shot 10: 0.05 second (20 FPS)

EXAMPLE 4 (FROM STILL FRAME RATES TO HIGH-SPEED VIDEO FRAME RATES)

Interval from shot 1 to shot 2: 0.33 second (3 FPS)
Interval between each of shots 2-5: 0.1 second (10 FPS)
Interval after shot 5: 0.00833 second (120 FPS)

In conjunction with this, given the limitations and tradeoffs of resolution and speed in some systems, a shift to a different frame rate may also include a shift to a different image resolution, such as going from a still image at a native resolution associated with 8K video, and shifting to a 4K resolution for high speed 120FPS frame rates.

This feature is typically employed while depressing just one convention shutter trigger button to one position and while holding it down. In alternative embodiments, this may be combined with any of the positions of the multi-position trigger button as discussed above.

HAPTIC FEEDBACK TO INDICATE SHUTTER OPERATION

With the FIG. 3 embodiment as an illustration, the strain gauge 114 may be replaced by a transducer that generates vibrations in the trigger button that are perceptible to the user. This may be a piezo electric or other device. For shutter modes such as electronic or global shutter that are inaudible, a user may desire to feel an indication to convey the frame rate. This is an alternative to audible beeps or ticks when frames are imaged, suitable for both unusually loud and quiet environments, and to avoid distracting or disturbing subjects, much as a vibration of a phone may silently signal in incoming call as an alternative to a ringtone.

The transducer may be separated from the body by vibration-damping or isolating material that tends to prevent transmission of the particular frequencies employed. The frequency may be tuned to resonate with the structure of the button with a finger applied to minimize the energy needed, and to minimize energy transmitted to the body.

The vibration generator need not be on the shutter button, but may be in any location where a user detects it, and without generating undue vibrations to affect image quality. The direction of vibration may be considered in concert with image stabilization systems to compensate for the vibration. Or, in a direction that moves the body in rotation about the lens axis, or other direction or axis.

It is desirable to avoid transmitting vibrations to the body to avoid shaking the body and blurring images. One feature may be to engage the vibration only after the shutter is closed, with a slight delay. The vibration would occur only between frame exposures, and this principle may also be applied for audible signals that may similarly cause vibration. Timing could ensure enough interval to dissipate vibration, before the shutter is opened for the next image.

The firmware may limit vibration operation or vibration strength (normally settable by the user to a comfortable detectable minimum) in a number of circumstances in which it is prone to affect image quality. Longer focal length lenses may invoke haptic suppression or limitation. Similarly, for longer shutter speeds.

The camera may also test effect either in a setup test of a given lens, support and speed combination and compare sharpness between haptic and non-haptic operation, or may take the initial image without haptic, subsequent with, compare on the fly and suppress if degradation is detected. But seriously, the system should be constructed to avoid any image degradation effect in any circumstance using high frequencies and low amplitudes. Ultrasonic and high frequencies may be suitable.

We claim:

1. A camera comprising;
a body;
a shutter trigger connected to the body;
a controller operably connected to the trigger;
a shutter operably connected to the trigger;
the shutter operable at a plurality of frame rates;
the shutter trigger having a plurality of conditions including a first condition and a second condition;
the controller responsive to the shutter trigger in the first condition to operate the shutter at a first frame rate;
the controller responsive to the shutter trigger in the second condition to operate the shutter at a different second frame rate; and
wherein the first frame rate is a single shot in response to actuation in the first condition for any duration of application, and continuous sequential shutter operation while in the second condition.

2. The camera of claim 1 wherein the second frame rate is greater than the first frame rate.

3. The camera of claim 1 wherein the second frame rate is a maximum frame rate associated with the shutter and the first frame rate is less than the maximum.

4. The camera of claim 1 wherein the shutter trigger includes a third condition, and the controller is responsive to the shutter trigger in the third condition to operate the shutter at a third frame rate different from the first and second frame rates.

5. The camera of claim 1 wherein the first frame rate is a single shot and the second and third frame rates are different continuous sequential shutter operation frame rates.

6. The camera of claim 1 wherein the shutter trigger is configured to be in the first condition in response to a first force, and to the second condition in response to a different second force.

7. The camera of claim 1 wherein the shutter trigger has a range of positions, and is configured to first condition in response to displacement from a rest position to a first position, and to the second condition in response to displacement to a different second position beyond the first position from the rest position.

8. The camera of claim 1 wherein the shutter trigger is a touch sensor and configured to the first condition in response to a first area of contact, and to the second condition in response to a different second area of contact.

9. The camera of claim 1 wherein the shutter trigger includes a vibration-generating transducer to provide haptic feedback to indicate shutter operation.

10. The camera of claim 1 wherein the controller is responsive to the shutter trigger in one selected position to operate the shutter at a first rate for an initial and second image, and at a different rate between a second and third image.

11. The camera of claim 1 wherein the shutter trigger includes a third condition, and the controller is responsive to the shutter trigger in the third condition to provide a selected camera function without operating the shutter, the selected function selected from a group of functions including wake-up, preview, focus and exposure actuation.

12. A camera comprising:
a body;
a shutter trigger connected to the body;
a controller operably connected to the trigger;
a shutter operably connected to the trigger;
the shutter operable at a plurality of frame rates;
the shutter trigger having a plurality of conditions including a first condition and a second condition;
the controller responsive to the shutter trigger in the first condition to operate the shutter at a first frame rate;
the controller responsive to the shutter trigger in the second condition to operate the shutter at a different second frame rate; and
wherein the shutter trigger includes a third condition, and the controller is responsive to the shutter trigger in the third condition to provide a selected camera function without operating the shutter, the selected function selected from a group of functions including wake-up, preview, focus and exposure actuation.

* * * * *